| United States Patent Office | 3,521,488
Patented July 21, 1970 |
|---|---|

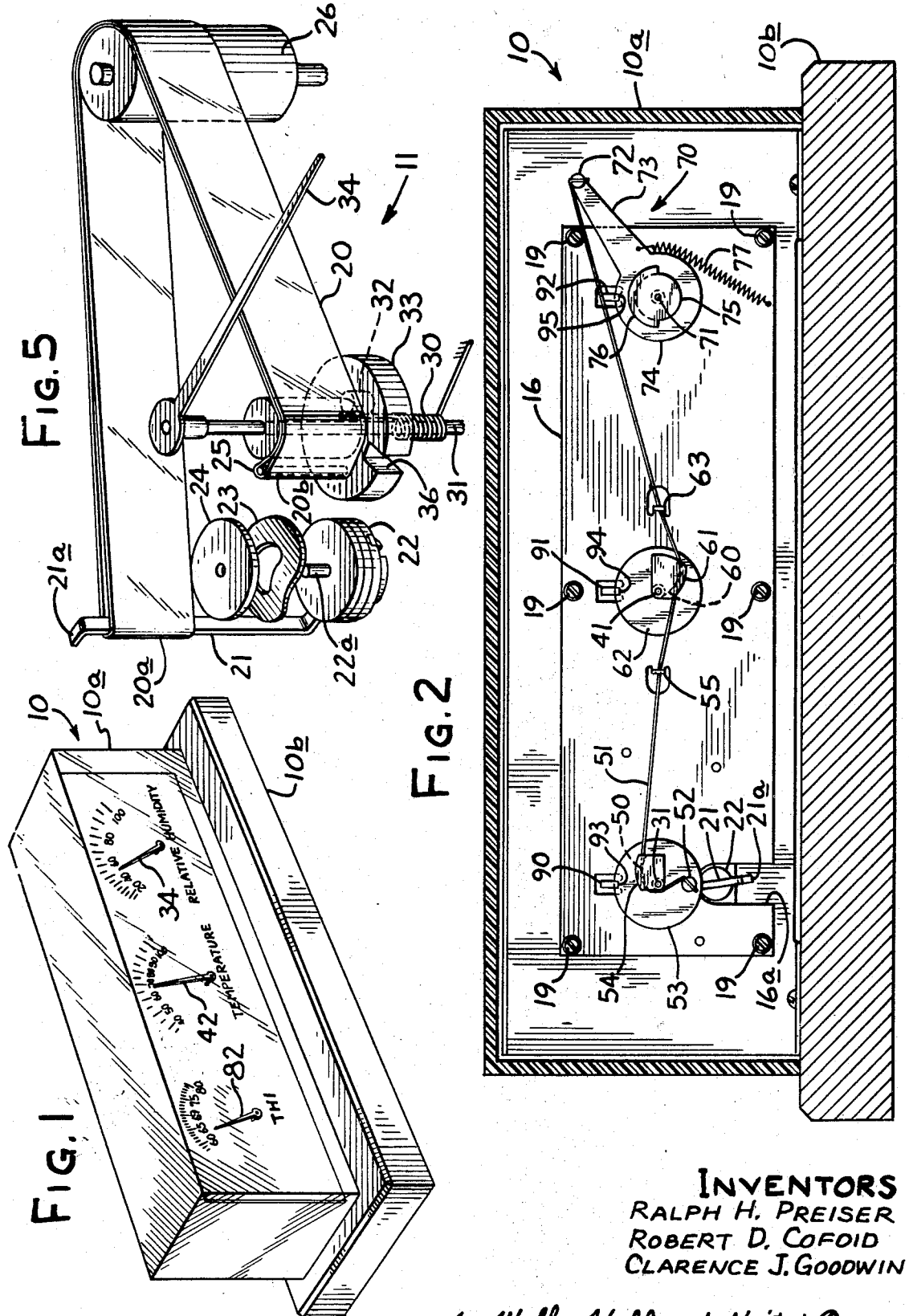

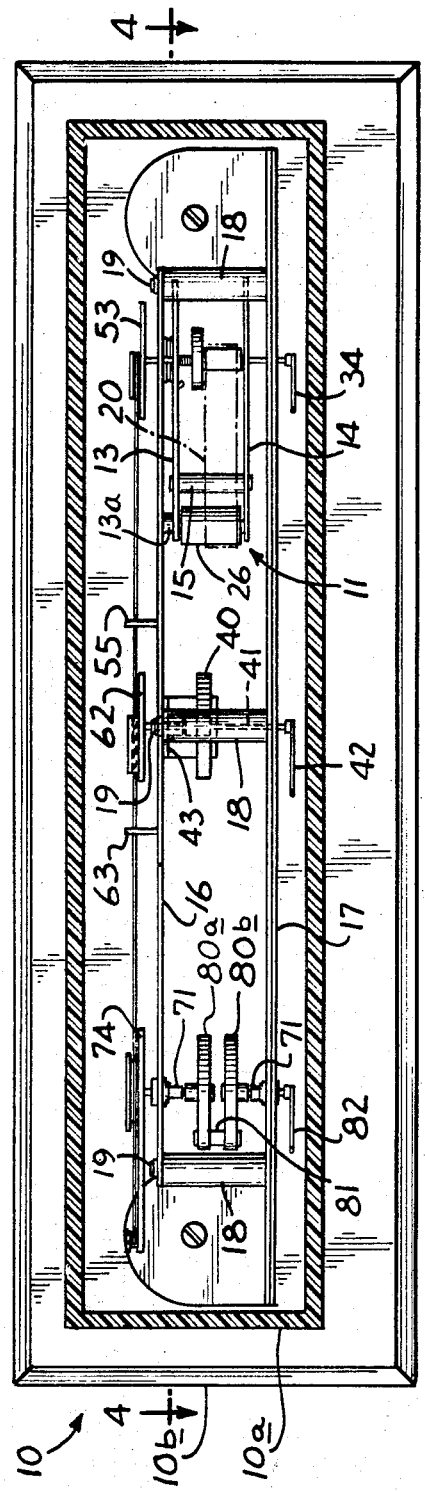
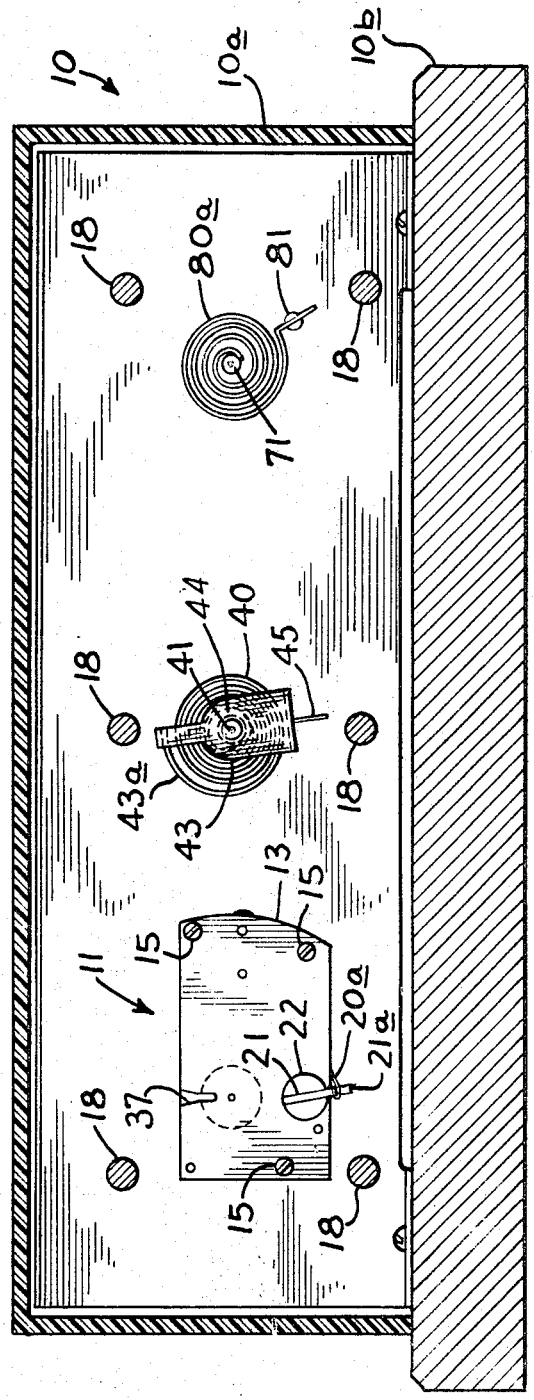

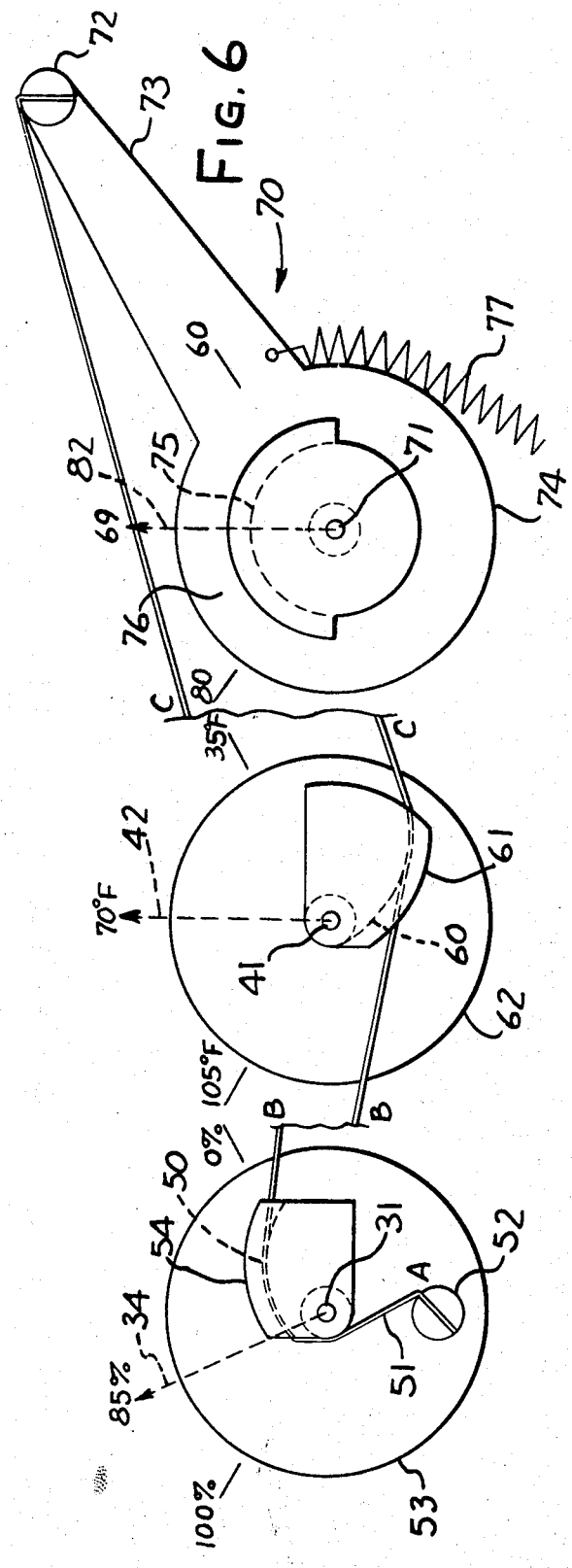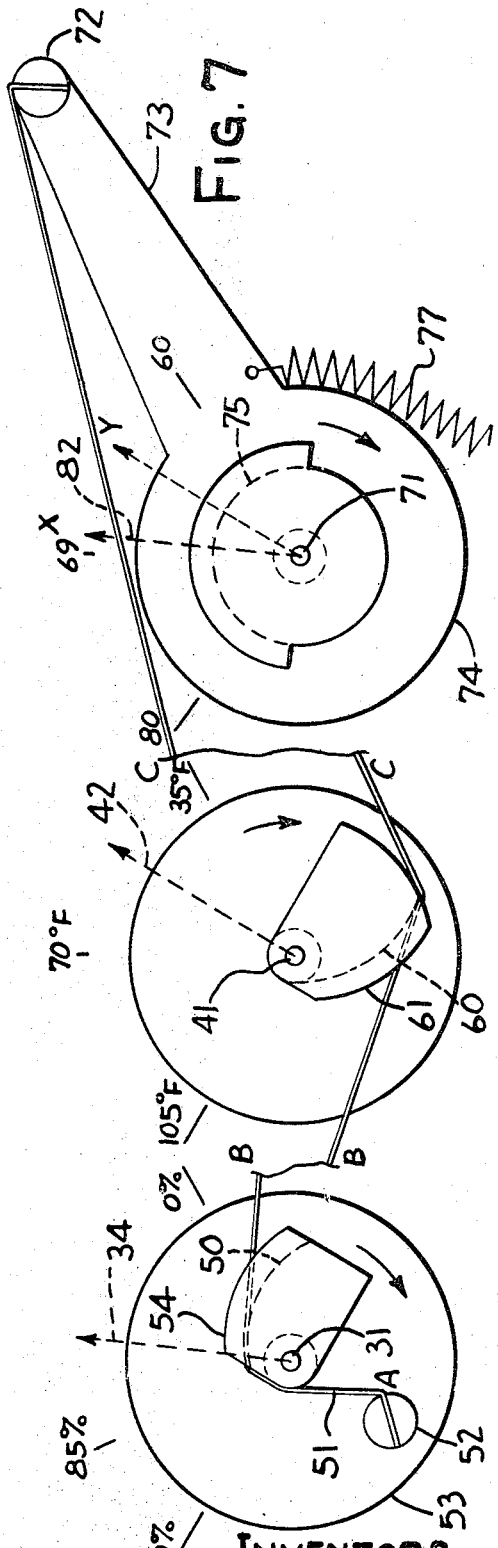

3,521,488
TEMPERATURE-HUMIDITY INDEX INSTRUMENT
Ralph H. Preiser, Robert D. Cofoid, and Clarence J. Goodwin, La Salle, Ill., assignors to General Time Corporation, Stamford, Conn., a corporation of Delaware
Filed Dec. 1, 1967, Ser. No. 687,317
Int. Cl. G01w 1/06
U.S. Cl. 73—336　　　　　　　　　　　　　　　　7 Claims

ABSTRACT OF THE DISCLOSURE

An instrument for determining the temperature-humidity index of the ambient atmosphere. A humidity responsive sensing element is connected to a first cam for producing a first continuous output varying as a predetermined function of the relative humidity (RH) of the ambient atmosphere. A temperature responsive sensing element is connected to a second cam for producing a second continuous output varying as a predetermined function of the dry bulb temperature $Td$ of the ambient atmosphere. The two cams act on a common filament, which is connected to a calculator element so that displacement of the filament by the two cams displaces the calculator element according to another predetermined function. A second temperature responsive sensing element is also connected to the calculator element, so that the resultant output displacement produced by the second temperature responsive sensing element and the calculator element follows the formula $THI = Td - 0.55(1 - RH)(Td - 58)$.

---

The present invention relates generally to devices for determining the temperature-humidity index of the ambient atmosphere and, more particularly, to an improved device for automatically determining the temperature-humidity index on a continuous basis.

The temperature-humidity index, referred to hereinafter as THI, is a number for indicating the comfort or discomfort of persons as a function of the temperature and relative humidity of the ambient atmosphere. The THI number is determined by a formula prescribed by the United States Weather Bureau as:

$$THI = Td - 0.55(1 - RH)(Td - 58)$$

where

THI is the temperature-humidity index expressed as a number, $Td$ is the dry bulb thermometer reading in degrees F., and RH is the percent relative humidity expressed as a decimal fraction.

It is a primary object of the present invention to provide an improved THI instrument which automatically determines the THI of the ambent atmosphere and produces a continuous output varying in accordance with variations in the THI. A more particular object of the invention is to provide such a device which provides a continuous direct indication of THI without any manual operations whatever.

Another significant object of the invention is to provide an automatic THI-determining device of the foregoing type which produces a continuous output suitable for application to an associated control system for automatic adjustment of temperature and/or humidity control units to maintain the THI at a preselected level.

It is a further object of the present invention to provide an improved THI instrument of the type described above which produces a continuous output which varies as a linear function of the THI of the ambient atmosphere.

Thus, a related object of the invention is to provide such an instrument which can be used with a linearly calibrated scale to provide a THI indicator, or with an automatic control system requiring a linear input.

Still another object of the invention is to provide such an improved THI instrument which minimized the relative load imposed on the temperature and relative humidity sensing elements and thereby provides significantly improved accuracy.

A still further object of the invention is to provide such an improved THI instrument which is capable of solving the standard THI formula with a high degree of accuracy over relatively wide ranges of temperature and relative humidity.

Yet another object of the invention is to provide such an improved THI instrument which can be accurately calibrated in a simple and efficient manner, thereby facilitating assembly of the instrument.

In one aspect of the invention, it is an object to provide a weather-indicating instrument which utilizes the THI-sensing elements to provide separate outputs representing the temperature and relative humidity of the ambient atmosphere.

It is a further object of the present invention to provide an automatic THI-determining device of the type described above which can be manufactured simply and rapidly at a low cost, and yet is accurate and reliable over long operating periods. A related object is to provide such a device which can be efficiently manufactured at high production rates.

Other objects and advantages of the invention will become apparent upon reading the following detailed description and upon reference to the drawings, on which:

FIG. 1 is a perspective view of a weather-indicating instrument embodying the present invention;

FIG. 2 is a rear elevation view of the instrument of FIG. 1 with the back wall of the housing removed to show the internal structure;

FIG. 3 is a top plan view of the instrument of FIG. 1 with the top wall of the housing removed to show the internal structure;

FIG. 4 is a vertical section taken along line 4—4 in FIG. 3;

FIG. 5 is a perspective view of the hygrometer mechanism in the instrument of FIG. 1 with certain of the parts shown in exploded positions;

FIG. 6 is an enlarged fragmentary rear plan view of the cam and calculator portions of the instrument of FIG. 1 at one particular THI reading;

FIG. 7 is an enlarged fragmentary rear plan view of the same structure shown in FIG. 6 at a different THI reading;

Figure 8:
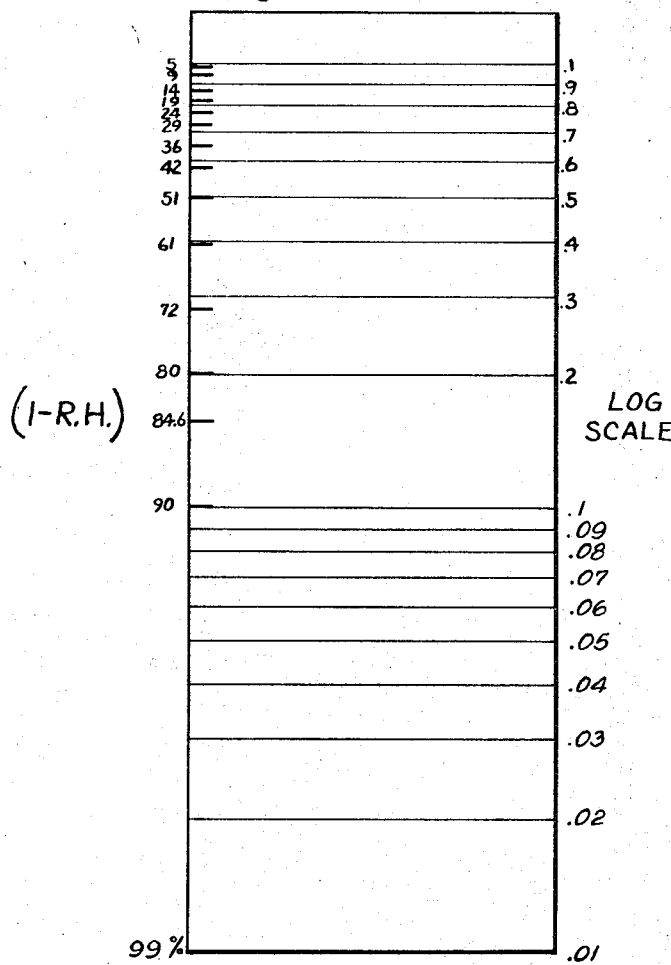
FIG. 8 is a log plot of selected values of a particular relative humidity function determined by the instrument of FIG. 1; and FI1. 9 is a schematic diagram illustrating the operation of a particular calculating element included in the instrument of FI1. 1.

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention as defined by the appended claims.

Turning now to the drawings and referring first to FIG. 1, there is illustrated a weather instrument 10 having three different meters for providing separate indications of relative humidity, temperature, and THI. The three meters are compactly contained in a single housing 10a on a base 10b, and they all function automatically to provide continuous direct readings of the relative humidity, temperature and THI of the ambient atmosphere, i.e., it is not necessary for the viewer to manipulate any manual adjustment, computing, or calculating mechanism. In other words, the person reading the instrument simply looks at the meters and observes the positions of the various pointers relative to the associated numerical scales of relative humidity, temperature, and THI values. To facilitate an understanding of the internal mechanism of the instrument 10, the three different units, namely the hygrometer unit, the thermometer unit, and the THI unit will be discussed separately below.

THE HYGROMETER UNIT

The hygrometer unit 11 (FIGS. 3–5) in the illustrative instrument 10 includes sensing and control elements mounted on a pair of frame plates 13 and 14 (FIG. 3) held in fixed spaced apart relationship by a plurality of spacer posts 15. The rear frame plate 13 is mounted via mounting studs 13a on the front of an elongated mounting plate 16, which in turn is mounted on a front display plate 17 and held in fixed spaced apart relationship relative thereto by means of a plurality of spacer posts 18 formed as integral parts of the display plate 17. A plurality of screws 19 are passed through the mounting plate 16 and threaded into the spacer posts 18 to hold the two plates 16, 17 togther.

For the purpose of sensing changes in the relative humidity of the ambient atmosphere, the hygrometer 11 includes a moisture-responsive sensing element 20 (see FIG. 5) disposed between the two frame plates 13, 14 and fixed at one end 20a to a bent leg on the end of a regulating lever 21. To permit manual adjustment of the fixed end 20a of the sensing element, the lever 21 is staked in a slot formed in a rotatable regulating disc 22 journaled on the back of the rear frame plate 13. An integral stub shaft 22a on the disc 22 extends through and slightly beyond the front side of the plate 13, where a spring washer 23 is fitted over the end of the stub shaft and held in place against the plate 13 by means of a rigid disc 24 secured to the end of the stub shaft 22a. Consequently, the regulating disc 22 is biased firmly against the frame plate 13 so that the regulating lever 21 is held firmly in place by friction, and yet the disc 22 can be rotated by manual movement of the lever 21 to adjust the fixed end 20a of the sensing element 20.

To facilitate manual movement of the lever 21 to adjust the fixed end 20a of the sensing element 20, the lever 21 extends slightly below the rear frame plate 13, as can be seen in FIGS. 2 and 4. and a lug 21a on the free end of the lever projects downwardly so that it is accessible to an operator in back of the instrument through a slot 16a in the mounting plate 16. Thus, the fixed end 20a of the sensing element 20 can be easily adjusted by simply moving the lug 21a to the left or right. As will be apparent from the ensuing description, the primary purpose of this adjustment feature is to permit the humidity indicator to be "zeroed" on the calibrated scale on the front of the display plate 17 (see FIG. 1).

The sensing element 20 in the illustrative hygrometer may be made of any of a number of different materials which change in length as a function of the humidity in the ambient atmosphere. The preferred material for the sensing element is commonly known as nylon–6, which is a condensation product of 1,6-hexanediamine and adipic acid. In the illustrative arrangement, the nylon–6 film 20 is in the form of a closed loop having its fixed end 20a formed by looping the film around the regulating lever 21, and its movable end 20b looped around a pin 25 included in the output assembly of the hygrometer. This closed loop construction of the sensing element facilitates assembly of the instrument, and is also more accurate because it eliminates the possibility of varying the two end points during manufacture of the instrument, such as might occur when the two end points are determined by clamping two free ends of a sensing element.

To enable the sensing element 20 to be accommodated in a structure considerably shorter than the length of the film strip, the mid-portion of the film is doubled around an idler roller 26 journaled between the two frame plates 13, 14 at a point spaced away from the two end points 20a and 20b. Thus, the overall configuration of the sensing film 20 is generally V-shaped (see FIG. 5). If desired, additional idler rollers could be provided, to form an S-shaped film configuration, for example, but it is desired to keep the frictional load imposed on the sensing film by such rollers to a minimum.

As the humidity in the ambient atmosphere increases, the length of the sensing film 20 also increases so as to permit advancing movement of the output assembly which carries the film pin 25. In the illustrative hygrometer, such advancing movement is effected by a biasing spring 30 (FIG. 5) coiled around an output shaft 31 and fixed at one end to the rear frame plate 13. The other end of the biasing spring 30 engages a lug 32 formed on the rear side of an output disc 33 which is fixed to the shaft 31 and carries the film pin 25 on the forward side thereof. The spring 30 thus urges the disc 33 in a counterclockwise direction, as viewed from the rear side thereof, so as to tension the sensing film 20. Consequently, as the sensing film 20 elongates in response to increasing humidity, the biasing spring 30 rotates the disc 33 and the output shaft 31 fixed thereto, in a counterclockwise direction (as viewed from the rear of the instrument) while maintaining the sensing film under tension. Conversely, when the sensing film 20 shrinks in response to decreasing humidity, it rotates the disc 33 and shaft 31 against the bias of the spring 30 in a clockwise direction (as viewed from the rear of the instrument) while the spring 30 still maintains the film 20 under tension.

In order to provide a visible indication of the angular movement of the output assembly of the hygrometer due to variations in the length of the sensing film 20, a pointer 34 is mounted on the forward end of the output shaft 31 on the front side of the display plate 17. This pointer 34 cooperates with a calibrated dial (FIG. 1) on the front of the display plate 17 so as to provide a continuous direct reading of the relative humidity sensed by the film 20. As mentioned previously, the pointer 34 may be "zeroed" on the calibrated dial by adjusting the fixed end 20a of the sensing film via the regulating lever 21. In the particular embodiment illustrated, the nylon– 6 sensing film 20 has a nonlinear characteristic, i.e., the film becomes increasingly responsive to changes in humidity as the relative humidity increases from zero to 100, so the scale associated with the pointer 34 is also nonlinear.

In order to insure that the hygrometer output assembly is in exactly the required position during assembly of the instrument, a keying slot 36 is formed in the periphery of the output disc 33 for registration with a corresponding slot 37 formed in the rear frame plate 14 of the hygrometer. During assembly of the unit, an appropriate tool is inserted into the frame slot 37 and the output assembly rotated until the tool slips into the disc slot 36, thereby indicating that the two slots are in register and holding the output assembly in that position. After the assembly has been completed, the registering tool is removed. This feature assures accurate reproducibility of the hygrometer unit of the instrument.

THE THERMOMETER UNIT

The temperature sensing element in the illustrative instrument is a temperature responsive coil 40 (FIG. 3) having its outer end fixed and its inner end secured to a shaft 41 journaled on the two mounting plates 16, 17. The coil 40 expands and contracts in response to increasing and decreasing temperature, respectively, thereby rotating the shaft 41 to provide a mechanical displacement corresponding to variations in the temperature of the ambient atmosphere.

In order to provide a visible indication of the angular movement of the shaft 41 due to the temperature changes sensed by the coil 40, a pointer 42 is mounted on the forward end of the shaft 41 on the front side of the display plate 17. This pointer 42 cooperates with a temperature scale (FIG. 1) on the front of the display plate 17 so as to provide a continuous direct reading of the ambient temperature. In the illustrative embodiment, a dial calibration of 120° was chosen to represent a temperature range of 35° F. to 105° F., and the materials and dimensions were then selected to provide a linear output of 1.7 degrees of angular rotation for each 1° F. change in temperature.

For the purpose of zeroing the pointer 42 on the numerical scale, a regulating plate 43 is secured to a dial bushing 44 journaled on the shaft 41, and the fixed end of the sensing coil 40 is connected to the regulating plate via leg 43a. Accordingly, manual adjustment of the regulating plate 43 varies the fixed end of the sensing coil 40 thereby turning the shaft 41 to "zero" the pointer 42 on the associated scale. To facilitate manual adjustment of the regulating plate 43, it is provided with a depending regulating tab 45 (FIG. 4) which is readily accessible for adjustment purposes.

THE THI UNIT

In accordance with the present invention, the temperature-humidity index of the ambient atmosphere is automatically and continuously determined by providing a first control means associated with the hygrometer for producing a continuous output varying as a predetermined function of the relative humidity, second control means associated with the thermometer for producing a second continuous output varying as a predetermined function of the temperature, automatic multiplier means operatively associated with the first and second control means for producing a third output varying as a predetermined multiplication function of relative humidity and temperature, and automatic calculating means responsive to the third output for producing a final continuous output representing the temperature humidity index of the ambient atmosphere. In the illustrative embodiment, the first output varying as a function of relative humidity is generated by a log cam 50 secured to the hygrometer output shaft 31 and acting on a tensioned filament 51 (FIGS. 2, 3, 6 and 7). One end of the filament 51 is fixed to a pin 52 projecting from a disc 53 secured to the hygrometer shaft 31 while the other end is biased to hold the filament under constant tension. To insure that the filament 51 does not slip off the cam 50, a retaining flange 54 is formed as an integral part of the cam element. If desired, the cam 50, the disc 53 and the flange 54 may all be formed as a single integral unit made of molded plastic, for example, so that these elements can be reliably reproduced with a fixed relationship to each other, even at high production rates. The pin 52 is preferably friction fitted in the disc 53 to permit manual rotation thereof for the purpose of, calibrating the instrument, as will be described in more detail below.

As the hygrometer rotates the shaft 31 in response to changing relative humidity conditions, the filament 51 is displaced longitudinally through a fixed eyelet 55 mounted on the back of the mounting plate 16 between the hygrometer and the thermometer. The filament displacement is continuously controlled by the cam 50, which is designed to vary the filament displacement as the log of (1−RH) so that the product of the functions (1−RH) and 0.55 (Td−58) can be obtained by adding the logs of the two functions and then determining the antilog of the resulting sum, as will be described in more detail below.

The second continuous output, which varies as a predetermined function of temperature, is generated by a cam 60 connected to the output shaft 41 of the thermometer unit and acting on the filament 51. The cam 60 is provided with a filament-retaining flange 61, with both the cam 60 and the flange 61 preferably being formed as an integral part of a disc 62 fixed to the rear end of the thermometer shaft 41. As the cam 60 rotates in response to movement of the thermometer shaft 41, it controls the displacement of the filament 51 through a second fixed eyelet 63 on the opposite side of the thermometer from the hygrometer. More particularly, the cam 60 is designed to vary the filament displacement as the log of 0.55 (Td−58) which is, in effect, automatically added to the first filament displacement log (1−RH), since both cam 50 and cam 60 are acting on the same filament simultaneously. In other words, the final filament displacement at the second eyelet 63 varies continuously as the sum of log (1−RH)+log 0.55 (Td−58).

If displacement of the filament 51 through the fixed eyelet 55 is designated ΔL1, the cam 50 is designed so that ΔL1 varies as the log of (1−RH). One method of designing the cam 50 to follow this function is illustrated in FIG. 8, where a number of values of (1−RH) for selected RH values are marked off along a log scale, and then corresponding displacement values for the selected (1−RH) values are simply measured off on a linear scale. The cam 50 is then shaped to provide the measured displacement values at the different positions of the output shaft 31 corresponding to the selected RH values, taking into account the angular displacement of the filament anchoring pin 52, which also affects the filament displacement through the fixed eyelet. Referring to FIG. 8, the value of (1−RH) for a selected RH value of 0.90 (90%), for example, is 0.10; for a selected RH value of 0.80 (80%), (1−RH) is 0.20; and so forth. Thus, the value of (1−RH) increases as RH decreases, and the log of this function can be determined graphically from the plotted values shown in FIG. 8 to determined the required profile of cam 50. It will be recognized that this graphical method is only one means of determining the required profile of the log cam 50, and that other methods such as mathematical computations and the like may be used instead of the illustrative graphical method.

Moving on to the thermometer cam 60, if displacement of the filament 51 through the second eyelet 63 due to the thermometer output displacement (ignoring the effect of ΔL1) is designated ΔL2, the cam 60 is designed so that ΔL2 varies as the log of 0.55 (Td−58). This cam may be designed by the same method described above in connection with cam 50 and FIG. 8, i.e., by scaling the required displacement values off a log plot of the function 0.55 (Td−58) for selected values of Td so that the log scale is used to effect the log conversion graphically. Alternatively, the required profile for the cam 60 may be determined by other appropriate methods such as mathematical computation and the like, as mentioned previously in connection with the hygrometer cam 50.

Since both the cam 50 and the cam 60 act on the same filament 51, it can be seen that the total displacement of the filament 51 through the second eyelet 63 represents the sum of ΔL1 and ΔL2, or log (1−RH)+log 0.55(Td−58). In order to obtain the product of $$(1-RH)0.55(Td-58)$$

the second end of the filament 51 is connected to an antilog calculator 70 secured to the rear end of a segmented THI output shaft 71. More particularly, the end of the filament 51 is fixed to a pin 72 on the end of a radial arm 73 formed as an integral part of a disc 74 and a circular drum 75 and retaining flange 76. For the purpose of tensioning the filament 51 between pins 52 and 72, and moving the caluculator 70 in response to positive or advancing displacement of the filament 51, a biasing spring 77 is connected from the base of the calculator arm 73 to the rear mounting plate 16 so as to continuously urge the calculator in a clockwise direction as viewed in FIGS. 2, 6 and 7. As the arm 73 is displaced angularly in response to displacement of the filament 51 by the hydrometer and thermometer assemblies described above, it can be seen that a varying proportion of the filament displacement is converted to angular displacement of the shaft 71.

Figure 9:
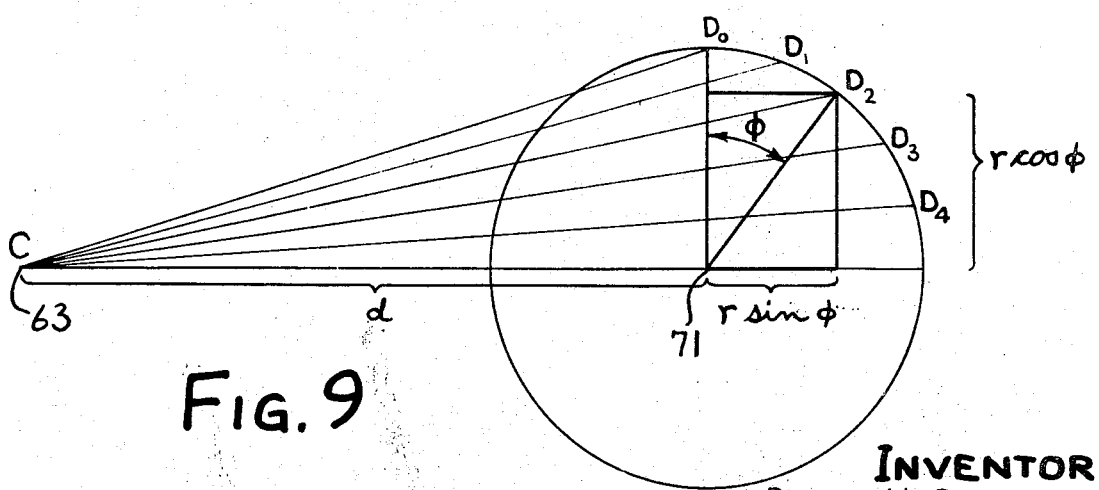

In keeping with the present invention, the arm 73 is designed so that the actual angular displacement of the shaft 71 effected by the total displacement of the filament 51 varies as the antilog of the sum of log $$(1-RH) + \log 0.55(Td-58)$$

i.e., the product of $(1-RH)$ $0.55(Td-58)$. Thus, referring to FIG. 9 the distance $d$ represents the length of filament 51 between the second eyelet 63 and the shaft 71$r$ is the fixed radius from the shaft 71 to the pin 72 on the calculator arm 73 and $\phi$ is the angle through which the pin 72 is rotated from its uppermost position ($D_0$) in response to displacement of the filament 51. The filament length from point C (the eyelet 63) to point D (the pin 72) than can be represented by the equation:

$$CD = \sqrt{(r \cos \phi^2 + (d+r \sin \phi)^2}$$
$$= \sqrt{r^2 + d^2 + 2dr \sin \phi}$$

Since $d$ and $r$ are constants it can be seen that the angle $\phi$ i.e. the angular displacement of the THI shaft is a function of the filament length CD. More particularly as the filament displacement rotates pin 72 clockwise from $D_0(\phi=0°)$ to $D_x(\phi=72°)$, an increasingly smaller proportion of the filament displacement is converted to angular displacement of the THI shaft 71. By appropriate selection of dimensions of the calculator 70 and associated elements, the angular displacement of the shaft 71 can thus be made to approximately follow the antilog values of the sum of log $(1-RH) + \log 0.55$ $(TD-58)$ represented by the total filament displacement $\Delta L1 + \Delta L2$. It has been found that the antilog values determined by the illustrative system are quite accurate in the middle of the THI range where the system normally operates most of the time, and deviates only slightly from the theoretical antilog values at the ends of the THI range. If desired, means other than the calculator 70 can be used to provide the desired antilog function; for example, cam means can be used to provide the desired antilog values in response to the filament displacement with a somewhat higher degree of accuracy at the ends of the THI range.

To insure that the filament 51 maintains at least a minimum counterclockwise torque on the calculator arm 70 at all angular positions thereof, the drum 75 maintains a fixed minimum radius between the axis of the THI shaft 71 and the filament 51. In the illustartive embodiment, the arm 70 generally moves only over the range of $D_0$ to $D_4$, corresponding to a THI range of 60 to 80, and the filament 51 engages the drum 75 only at the most advanced position of the arm 70 ($D_4$). Consequently, the effect of the drum 75 need not be considered in designing the system to follow the antilog function as described above.

For the purpose of subtracting the product determined by the antilog calculator 70 from the dry bulb temperature $(Td)$ in accordance with the equation $$Td - (1-RH)\ 0.55\ (Td-58)$$

a pair of temperature sensing elements in the form of a bimetallic coils 80$a$ and 80$b$ are connected in series between the two segments of the THI output shaft 71 between the two frame plates 16, 17. The outer ends of the coils 80$a$, 80$b$ are joined by an interconnecting pin 81 (FIGS. 3 and 4) while the inner ends are fixed to the corresponding segments of the shaft 71 for rotating the same in response to temperature changes in the ambient atmosphere. Since the product $(1-RH)\ 0.55\ (Td-58)$ is to be subtracted from the temperature $Td$, the coils 80$a$, 80$b$ must be arranged to turn the shaft 71 in a direction opposite from the direction in which the same shaft is turned by the calculator 70 for any given temperature change. Thus in the illustrative embodiment, an increase in tempearture increases L2 to displace the calculator 70 and shaft 71 in a clockwise direction as viewed in FIGS. 2, 6 and 7, while the coils 80$a$, 80$b$ respond to the same incerase in temperature to turn the shaft 71 counterclockwise. The resultant actual displacement of the shaft 71 is thus the difference $$Td - (1-RH)\ 0.55\ (Td-58)$$

or a direct indication of THI.

Although dual tempareture sensing coils 80$a$, 80$b$ have been employed in the illustrative embodiment, primarily for the purpose of providing a relatively large displacement of the shaft 71, e.g., 3.4 degrees angular displacement for each THI unit, it will be understood that a single bimetallic coil may be used if desired. In this case, the inner end of the single coil will be connected to one segment of the shaft 71, and the outer end would be connected to the other shaft segment via an interconnecting disc, lever or the like.

To correlate the angular displacement of the shaft 71 with actual THI figures, a pointer 82 is mounted on the forward end of the shaft 71, for cooperation with a calibrated scale of THI values on the front of the display plate 17. In the particular embodiment illustrated, the THI scale ranges from 58 to 80 over an arc of 75 angular degrees, and the materials and dimensions are selected to provide a linear output of 3.4 degrees of angular rotation for each THI unit.

In order that the operation of the illustrative THI instrument may be understood more clearly, the entire cam and calculator system associated with the filament 51 has been shown for two different relative humidity and temperature conditions in FIGS. 6 and 7. It should be noted that portions of the scales or relative humidity, temperature, and THI, which actually appear on the front of the instrument, have been superimposed on FIGS. 6 and 7 to facilitate an understanding thereof. Thus, in FIG. 6, the relative humidity pointer 34 is at the 85% relative humidity position, the temperature pointer 42 is at the 70° F. position, and the THI pointer 82 is at the 69 position, which is the correct THI for a relative humidity of 85% and temperature of 70° F. In FIG. 7, the relative humidity has dropped below the 85% level, thereby rotating the cam 50 in a clockwise direction and displacing the filament 51 to the right by an increment $\Delta L1$ equal to the difference between the values of log $(1-RH)$ for the 85% relative humidity indicated in FIG. 6 and the sub-85% realtive humidity level indicated in FIG. 7. In other words, if the length of filament between the pin 52 and the eyelet 55 is considered to be the length of filament between points A and B in FIGS. 6 and 7, AB in FIG. 6 is greater than AB in FIG. 7, and the difference between the two AB lengths is equal to L1.

The temperature in FIG. 7 has also dropped below 70° F., thereby rotating the cam 60 in a clockwise direction to displace the right hand end of the filament 51 to the left by an increment $\Delta L2$ equal to the difference between the values of log $0.55\ (Td-58)$ for the 70° F. temperature in FIG. 6 and the sub-70° F. temperature of FIG. 7. Thus. if the length of filament between eyelets 55 and 63 is considered to be the length of filament between points B and C in FIGS. 6 and 7, BC in FIG. 6 is less than BC in FIG. 7, and the difference between the two BC lengths is equal to L2. The resultant filament displacement at the pin 72 on the antilog calculator 70 is the sum of displacements L1 and L2, which in this case is positive so as to rotate the calculator 70 in a clockwise direction. The resulting displacement of the THI output shaft 71, due to the action of the calculator 70 alone, is represented by the first position of the THI pointer 82 marked X in FIG. 7. However, the temperature sensing coil 80 moves the shaft 71 further in the same direction, thereby advancing the pointer 82 to the second position marked Y in FIG. 7. It is position Y which represents the true THI reading.

In order to calibrate the illustrative instrument, a series of three tabs 90, 91, and 92 (FIG. 2) project rearwardly from the mounting plate 16 for cooperation with corresponding slots 93, 94, and 95 formed in the peripheries of the three discs 53, 62, and 74, respectively. To calibrate the instrument, the hygrometer disc 53 and the thermometer disc 62 are first positioned so that the slots 93, 94 therein register with the corresponding tabs 90, 91, and then the pin 52 is turned to draw the filament 51 taut and to bring the third slot 95 in the calculator disc 74 into register with the corresponding tab 95. This procedure assures the proper filament length, as well as the proper relationship among the various cam and calculator elements. It will be understood that the calibrating tabs 90, 91, 92 may be bent into the cooperating slots 93, 94, 95 during the calibrating procedure, and then bent away therefrom after the calibration has been completed so that the various discs are unobstructed during normal operation of the instrument. After the tabs have been bent clear of their respective slots, the hygrometer and thermometer units are individually calibrated, via the regulating elements 21 and 43 described previously, according to the ambient conditions existing at the time of assembly. The correct THI value for the ambient conditions is then determined by appropriate means, such as from charts or mathematical computations, and the THI pointer 82 is staked on the shaft 71 so as to register with that particular value on the THI scale on the front of the display plate 17. This completes the calibration of the instrument, and it will thereafter automatically respond to changes in the ambient conditions to indicate relative humidity, temperature, and THI.

As can be seen from the foregoing detailed description, the present invention provides an improved THI instrument which automatically determines the THI of the ambient atmosphere and produces a continuous output varying in accirdance with variations in the THI. This instrument provides a continuous direct indication of THI without any manual operations whatever, via a continuous output which is suitable for application to an associated control system for automatic adjustment of temperature and humidity control units to maintain the THI at a preselected level. Moreover, the continuous output varies as a perfectly linear function of the THI of the ambient atmosphere, and thus can be used with a linearly calibrated scale to provide a THI indicator, for with an automatic control system requiring a linear output. The cam and filament system associated with the various temperature and humidity sensing elements minimizes the relative load imposed on the sensing elements and thereby provides significantly improved accuracy. It has been demonstrated that the instrument provided by this invention is capable of solving the standard THI formula with a high degree of accuracy over relatively wide ranges of temperature and relative humidity. The instrument can be accurately calibrated in a simple and efficient manner, thereby facilitating assembly of the instrument, and the entire instrument can be manufactured simply and rapidly at a low cost even at high production rates. Furthermore, the THI-sensing elements can also be used to provide separate outputs representing the temperature and relative humidity of the ambient atmosphere, so as to provide a complete weather instrument.

We claim as our invention:

1. A device for automatically and continuously determining the temperature-humidity index of the ambient atmosphere, said device comprising the combination of humidity responsive means for producing a first continuous mechanical output varying as a predetermined log function of the relative humidity of the ambient atmosphere, temperature responsive means for producing a second continuous mechanical output varying as a predetermined log function of the temperatures of the ambient atmosphere, means for mechanically adding said first and second outputs to produce a third continuous mechanical output representing the sum of said first and second outputs, means responsive to said adding means for producing a fourth continuous mechanical output representing the antilog of said sum, second temperature responsive means for producing a fifth continuous mechanical output representing the temperature of the ambient atmosphere, and means for subtracting said antilog—representing fourth output from said temperature—representing fifth output for producing a final continuous mechanical output representing the temperature-humidity index of the atmosphere.

2. A device for automatically and continuously determining the temperature-humidity index of the ambient atmosphere, said device comprising the combination of first sensing means responsive to changes in relative humidity and first mechanical control means operatively associated with said first sensing means for producing a first continuous mechanical output corresponding to (1−RH) where RH represents the percent relative humidity of the ambient atmosphere expressed as a decimal fraction, second sensing means responsive to changes in temperature and second mechanical control means operatively associated with said second sensing means for producing a second continuous mechanical output corresponding to 0.55 ($Td$−58) where $Td$ represents the dry bulb temperature of the ambient atmosphere in degrees Fahrenheit, third sensing means responsive to changes in temperature for producing a third continuous mechanical output corresponding to $Td$, and automatic mechanical THI determination means operatively associated with said first, second, and third sensing and control means for receiving said first, second, and third outputs and responding thereto to produce a fourth mechanical output corresponding to [$Td$−0.55(1−RH)($Td$−58)].

3. A device for automatically and continuously determining the temperature-humidity index of the ambient atmosphere, said device comprising the combination of humidity responsive sensing means and first cam means operatively associated with said humidity responsive sensing means, said first cam means producing a first continuous output varying as a predetermined function of the relative humidity of the ambient atmosphere, temperature responsive sensing means and second cam means operatively associated with said temperature responsive means, said second cam means producing a second continuous output varying as a predetermined function of the temperature of the ambient atmosphere, filament means operatively engaging said first and second cam means for displacement in response to said first and second outputs as a predetermined function of both the relative humidity and the temperature of the ambient atmosphere, and calculating means operatively associated with said filament means for displacement in response to displacement of said filament means for producing a third output representing the temperature-humidity index of the ambient atmosphere.

4. A temperature-humidity index device as set forth in claim 3 in which a temperature responsive sensing means is operatively associated with said calculating means for controlling said third output.

5. A temperature-humidity index device as set forth in claim 3 in which said first output displaces said filament means as a function of (1−RH) where RH represents the percent relative humidity of the ambient atmosphere expressed as a decimal fraction, said second output displaces said filament as a function of ($Td$−58) where $Td$ represents the dry bulb temperature of the ambient atmosphere in degrees Fahrenheit and said third output varies as a function of [$Td$−0.55(1−RH)($Td$−58)].

6. A temperature-humidity index device as set forth in claim 5 in which said first output displaces said filament means in accordance with a log of (1−RH) and said second output displaces said filament means in accordance with the log of 0.55($Td$−58) whereby the total displacement of said filament represents the sum of said logs, said calculating means is displaced in accordance with the antilog of said sum, and temperature responsive output means is operatively associated with said calculating means for producing said third output.

7. A device for automatically and continuously determining the temperature-humidity index of the ambient atmosphere, said device comprising the combination of relative humidity sensing means for producing a mechanical displacement in response to changes in relative humidity, a first log cam operatively connected to said relative humidity sensing means for producing a mechanical displacement corresponding to the log of $(1-RH)$, where RH represents relative humidity as a decimal fraction, in response to the mechanical displacement of said relative humidity sensing means, first temperature sensing means for producing a mechanical displacement in response to changes in atmospheric temperature, a second log cam operatively associated with said temperature sensing means for producing a mechanical displacement corresponding to the log of $0.55(Td-58)$, where $Td$ represents dry bulb temperature in °F., in response to the mechanical displacement of said temperature sensing means, second temperature sensing means for producing a mechanical displacement corresponding to $Td$ in response to changes in atmospheric temperature, and automatic calculating means operatively associated with said first and second log cams and said second temperature sensing means for automatically adding the mechanical displacements of said first and second log cams and producing a mechanical displacement corresponding to the antilog of the resulting sum, and automatically subtracting said sum from the mechanical displacement of said second temperature sensing means to produce a mechanical output corresponding to the THI of the ambient atmosphere.

References Cited

UNITED STATES PATENTS

| | | | |
|---|---|---|---|
| 2,294,540 | 9/1942 | Edwards | 73—338.3 |
| 3,254,532 | 6/1966 | Smith | 73—336 |
| 3,399,569 | 9/1968 | Nakano | 73—336 |

LOUIS R. PRINCE, Primary Examiner

D. E. CORR, Assistant Examiner

U.S. Cl. X.R.

73—337.5, 344